US009107388B2

(12) United States Patent
Howell (10) Patent No.: US 9,107,388 B2
(45) Date of Patent: Aug. 18, 2015

(54) WRAP-AROUND CANINE HUNTING VEST WITH LOWER ABDOMEN PROTECTION

(71) Applicant: BYMOMS4PETS, LLC, Elkhorn, NE (US)

(72) Inventor: Dawn Marie Howell, Elkhorn, NE (US)

(73) Assignee: BYMOMS4PETS, LLC, Elkhorn, NE (US)

( * ) Notice: Subject to any disclaimer, the term of this patent is extended or adjusted under 35 U.S.C. 154(b) by 5 days.

(21) Appl. No.: 13/764,039

(22) Filed: Feb. 11, 2013

(65) Prior Publication Data
US 2014/0190424 A1    Jul. 10, 2014

Related U.S. Application Data

(60) Provisional application No. 61/750,296, filed on Jan. 8, 2013.

(51) Int. Cl.
*A01K 13/00* (2006.01)
*A01K 29/00* (2006.01)
*A01K 27/00* (2006.01)

(52) U.S. Cl.
CPC ............. *A01K 13/006* (2013.01); *A01K 27/002* (2013.01)

(58) Field of Classification Search
CPC ..... A01K 13/006; A01K 13/00; A01K 29/00; A01K 27/002; A61D 9/00; A41F 19/005; A41D 15/002
USPC .......... 119/850, 854, 856, 863, 865, 867, 868
IPC ............................................ A01K 13/00, 29/00
See application file for complete search history.

(56) References Cited

U.S. PATENT DOCUMENTS

| 4,577,591 | A  | * | 3/1986 | Wesseldine | 604/391 |
| 5,887,772 | A  | * | 3/1999 | Dooley | 224/191 |
| 5,941,199 | A  | * | 8/1999 | Tamura | 119/850 |
| 6,454,735 | B1 | * | 9/2002 | Hamada | 602/61 |
| 6,912,976 | B2 | * | 7/2005 | Everett | 119/858 |
| 7,926,122 | B1 | * | 4/2011 | Countryman | 2/227 |
| 2010/0206247 | A1 | * | 8/2010 | Cheng et al. | 119/850 |
| 2012/0160184 | A1 | * | 6/2012 | Lichvar | 119/725 |

FOREIGN PATENT DOCUMENTS

JP        2002272300 A  *  9/2002  ............. A01K 13/00

OTHER PUBLICATIONS

Machine translation of JP 2002272300 to Kitano, published Sep. 2002.*

* cited by examiner

*Primary Examiner* — Kathleen Alker
(74) *Attorney, Agent, or Firm* — Suiter Swantz pc llo (57) ABSTRACT

A canine ventral chest and lower abdomen protection garment is disclosed for protection of a canine from impact with an obstacle. The garment mounts to the canine via a collar, a thoracic strap and a lumbar strap for a secure placement. A caudal portion of the garment rear of the lumbar strap protects the lower abdomen and urogenital regions. This caudal portion is allowed to gravitationally fold distal from the skin of the canine allowing for unobstructed urination. The same caudal portion of the garment, when impacted by an obstacle, returns proximal to the skin of the canine and acts to protect the lower abdomen and urogenital regions of the canine. The caudal portion of the garment is stitched in multiple lines allowing for permanently sizing the garment for a specific canine while retaining the integrity of the overall garment.

9 Claims, 7 Drawing Sheets

WRAP-AROUND CANINE HUNTING VEST WITH LOWER ABDOMEN PROTECTION

CROSS-REFERENCE TO RELATED APPLICATIONS

The present application claims the benefit under 35 U.S.C. §119(e) of U.S. Provisional Application 61/750,296 filed Jan. 8, 2013 entitled "Wrap-Around Canine Hunting Vest with Lower Abdomen Protection" which is incorporated by reference in its entirety.

TECHNICAL FIELD

The present disclosure generally relates to the field of pet protection harnesses. More particularly, embodiments of the present invention relate to a shield garment capable of protection of a chest region, a lower abdomen region and a urogenital region of a canine.

BACKGROUND

An owner of a domestic canine may prefer to allow the domestic canine access to an area which may injure the animal should the animal's chest and lower abdomen contact hazards in the area. Additionally, a hunting canine may be desired to enter areas of specific hazards.

For example, a hunter may wish to hunt in an area containing barbwire fencing. Should an unprotected canine traverse the horizontal strands of a barbwire fence, the unprotected canine may be injured by the horizontal wire or the sharpened barbs.

Previous attempts at protection of a canine have found limited success. These attempts may include a chest only protector garment capable only of chest protection. These garments may leave unprotected the penis of a male and the lower nipples of a female canine resulting in permanent damage to vital reproductive organs.

Therefore, an owner of a domestic canine may find useful a harness vest garment capable of protection of a chest and sternum region as well as the lower abdomen and urogenital region of a canine.

SUMMARY

Accordingly, an embodiment of the present invention is directed to a canine ventral protection garment, comprising a chest shield, the chest shield configured to cover an area from a tracheal region of a canine to a brisket region of the canine, the chest shield having an attached collar on a cranial end and an attached brisket couple on a caudal end, the collar configured to removably secure the canine ventral protection garment to the canine, a ventral shield, the ventral shield having a sternal shield combined with a caudal abdominal shield, the ventral shield configured to protect an area of the canine: 1) caudo-cranially from the brisket region to a urogenital region of the canine and 2) laterally extending equally and oppositely from a sternum region to a region encompassing at least a costal cartilage range of each rib of the canine, a cranial end of the ventral shield coupled to the chest shield at the brisket couple, a thoracic strap coupled to the ventral shield, the thoracic strap configured to encircle the trunk of the canine about a caudal-cranial axis of the canine, the thoracic strap configured to removably secure the canine ventral protection garment to the canine, a lumbar strap coupled to the ventral shield, the lumbar strap configured to encircle the trunk of the canine about the caudal-cranial axis of the canine, the lumbar strap configured to removably secure the canine ventral protection garment to the canine, wherein the caudal abdominal shield extends caudally from the caudal end of the sternal shield, the caudal abdominal shield is configured for a first position gravitationally distal from the canine, and a second position proximal to the canine, the caudal abdominal shield configured to protect a caudal abdominal region and urogenital region of the canine, the caudal abdominal shield movable from the first position to the second position as a result of impact with an obstacle.

An additional embodiment of the present invention is directed to a canine ventral protection garment, comprising: a chest means for protection of a canine from a tracheal region to a brisket region, a ventral means for protection of the canine from the brisket region to a urogenital region, means for elastically coupling the chest means to the ventral means, means for detachably mounting the canine ventral protection garment to the canine, including: a collar means for detachably mounting a cranial end of the canine ventral protection garment around a neck of the canine, a thoracic means for detachably mounting a central portion of the canine ventral protection garment around a thoracic trunk of the canine, a lumbar means for detachably mounting a caudal portion of the canine ventral protection garment around a lumbar trunk of the canine, means for displacing a caudal abdominal portion of the ventral means to gravitationally extend distal from the canine enabling the canine to unobstructedly urinate, means for retracting the caudal abdominal portion of the ventral means to protect the urogenital region of the canine as the caudal portion of the ventral means is impacted by an obstacle.

It is further contemplated; embodiments of the present invention may include a detachable collar from the chest shield and a collar of sufficient strength to lift the canine to which it is mounted.

Additional embodiments of the present invention include thoracic and lumbar straps detachable from the ventral shield and the thoracic and lumbar straps further configured to accept a removable auxiliary cargo compartment, the removable auxiliary cargo compartment configured for accepting and securely carrying cargo.

Additional embodiments of the present invention include a hunting vest constructed of a multi-layer pliable fabric, the multi-layer pliable fabric optimally suited for obstacle resistance and a brisket couple configured for elastic deformation under tension.

Additional embodiments of the present invention include thoracic and lumbar straps are configured with hook and loop fasteners for removably securing the canine ventral protection garment to the canine and the caudal abdominal shield configured with a plurality of sizing stitches, the sizing stitches configured for coupling at least two layers of the caudal abdominal shield as a section of the caudal abdominal shield caudal to the sizing stitches is removed.

Additional embodiments of the present invention include a the plurality of sizing stitches parallel to a caudal end of the caudal abdominal shield in a circular configuration and also the plurality of sizing stitches oppositely aligned with the caudal end of the caudal abdominal shield in in a circular configuration.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the subject matter disclosed, which is illustrated in the accompanying drawings. It is to be noted the following description and drawings may reference a preferred embodiment of the present invention configured for a canine. While a canine may be one animal for which the invention may be configured, it is to be considered the present invention may be configured for a variety of animals.

Embodiments of the present invention include a canine ventral protection garment mountable on the canine for ventral protection of the canine. As the canine's ventral regions may impact obstacles during traversal through rough terrain, the ventral protection garment keeps vital organs, fur, and skin from damage. Embodiments offer protection of the tracheal and chest region, brisket and upper abdomen, and urogenital and lower abdomen regions of the canine. The garment extends caudally of sufficient length over the lower abdomen to particularly protect the genitalia of the canine.

One embodiment may detachably mount to a canine for protection of a canine trained for hunting. As mounted on a canine, a caudal abdominal shield may be gravitationally pulled distal from the skin of the canine as gravity acts upon the caudal abdominal shield. However, when the canine impacts an obstacle, the lower abdomen flap is pushed by the obstacle proximally to the lower abdomen of the canine protecting the lower abdomen and genitalia.

Further, a device tightly proximal to the ventral and wrapped around the trunk of a canine may aid in calming the canine. As a blanket wrapped around a mammal, the wrap around canine vest may aid in relaxation of a canine.

Figure 1:
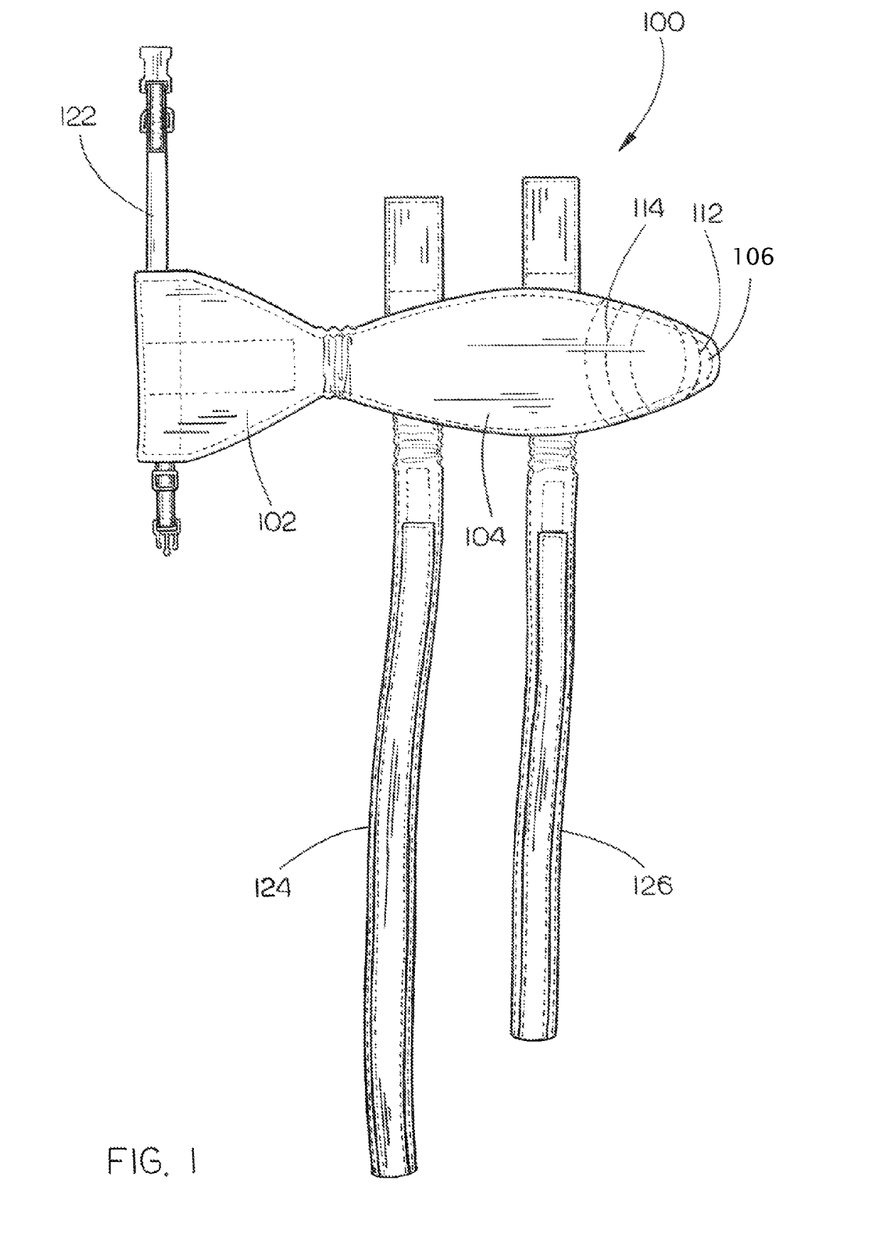
FIG. 1 is a diagram of a proximal side of the wrap-around canine hunting vest in accordance with an embodiment of the present invention.

Referring to FIG. 1, a diagram of a proximal side of the wrap-around canine hunting vest in accordance with an embodiment of the present invention is shown. Specific parts of the wrap-around canine hunting vest may include a chest shield 102, a sternal shield 104 and a caudal abdominal shield 106. Combined, the sternal shield 104 and the caudal abdominal shield 106 form the ventral shield 110. A brisket couple 108 joins the chest shield 102 to a cranial end of the ventral shield 110. Each of the parts combines to create a single garment to form the complete wrap around canine hunting vest 100.

Coupled to the hunting vest 100 are collar 122, thoracic strap 124 and lumbar strap 126. Collar 122 may be one of permanently coupled to the cranial end of the chest shield 102 or detachably coupled. Collar 122 may be constructed of sufficient strength to lift the canine to which it is mounted. In embodiments, collar 122 is constructed of nylon web material configured with a ring to which an owner may attach a leash and a buckle for detachably joining together a first end to a second end.

Thoracic strap 124 is configured to mount around the trunk of the canine proximal to, yet caudal of, the forward legs of the canine. In embodiments, thoracic strap 124 is configured with at least one elastic portion to allow for secure fit on the canine. Fasteners may detachably join the thoracic strap around the trunk of canine. Preferably, hook and loop fasteners may be detachably and overlappingly join the ends of the thoracic strap. In embodiments, a buckle on a first shorter end of the thoracic strap may permit a second end of the thoracic strap to pass through the buckle and detachably join to itself.

Lumbar strap 126 is configured to mount around the trunk of the canine proximal to, yet cranial of, the hind legs of the canine. As with the thoracic strap 124, lumbar strap 126 is configured with an elastic portion for secure fit.

Additional fastener types may provide function for the thoracic and lumbar straps. It is contemplated herein; buttons, belts with holes combined with a belt buckle, magnetic fasteners, snaps and the like may provide sufficient mounting function.

In addition, alternative lengths of each of thoracic strap 124 and lumbar strap 126 may function for optimal security as mounted on the canine. For example, an increased length of the buckle side of thoracic strap may allow for a joining of opposite sides of thoracic strap near the spine region of the canine.

Further, each of thoracic strap 124 and lumbar strap 126 may be configured for maximum visibility. For example, brightly colored material and reflective tape may provide additional visibility for the canine fitted with the protective vest.

Figure 2:
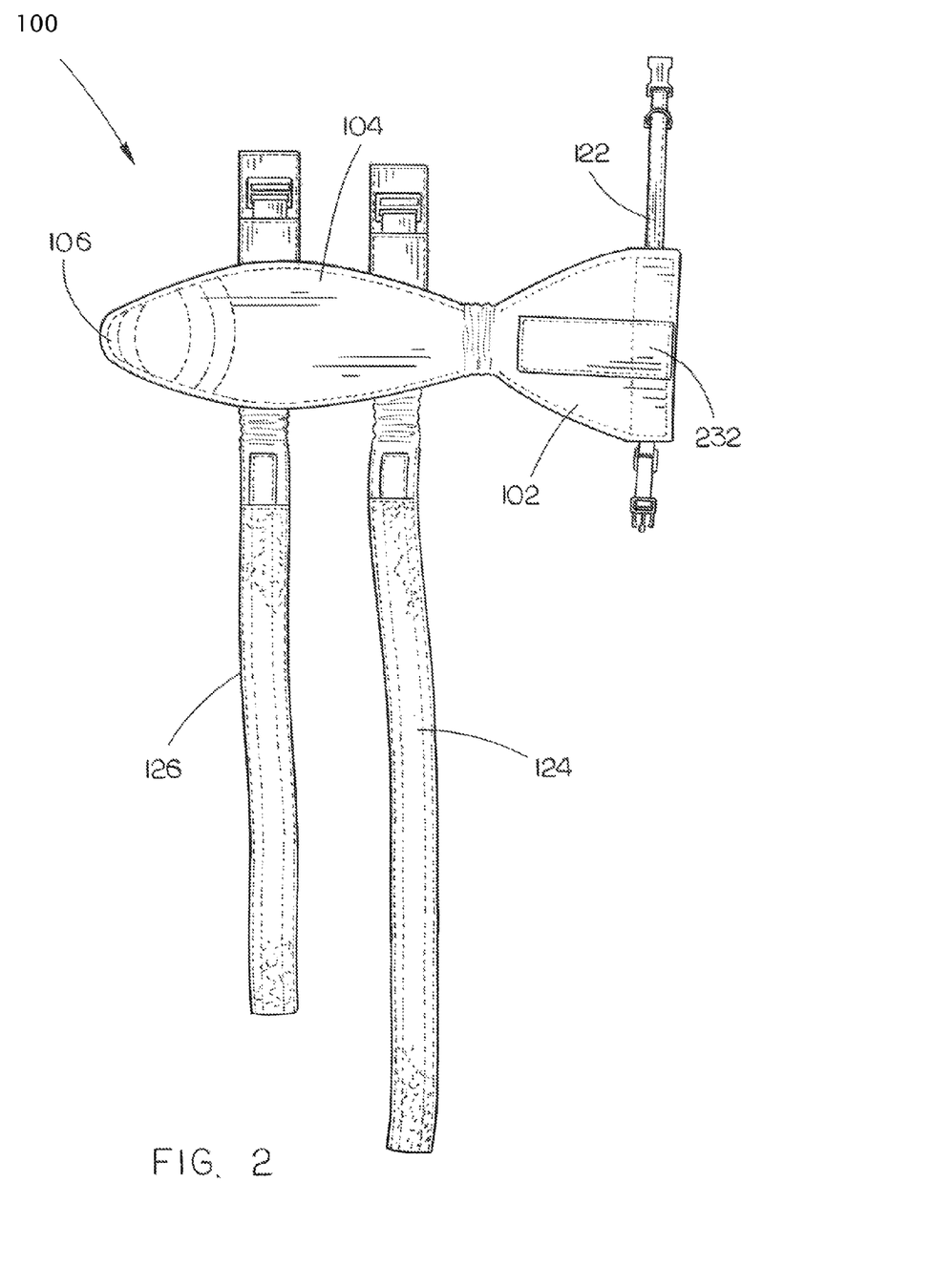
FIG. 2 is a diagram of a distal side of the wrap-around canine hunting vest in accordance with an embodiment of the present invention.

Referring to FIG. 2, a diagram of a distal side of the wrap-around canine hunting vest in accordance with an embodiment of the present invention is shown. Chest shield 102 may also be configured for maximum visibility. With reflective material 232, coupled to the distal side of chest shield 232, the hunting vest may be more visible as viewed from the head of the canine.

In embodiments, buckles may be functional on thoracic strap 124 and lumbar strap 126 configured for each strap to loop through and overlappingly couple to itself. In this configuration, thoracic and lumbar straps may provide an adjustable fit for a variety of trunk sizes of canines. For example, should a canine become pregnant, an owner may continue to mount the wrap around canine hunting vest to the pregnant canine as the trunk continues to grow.

Figure 3:
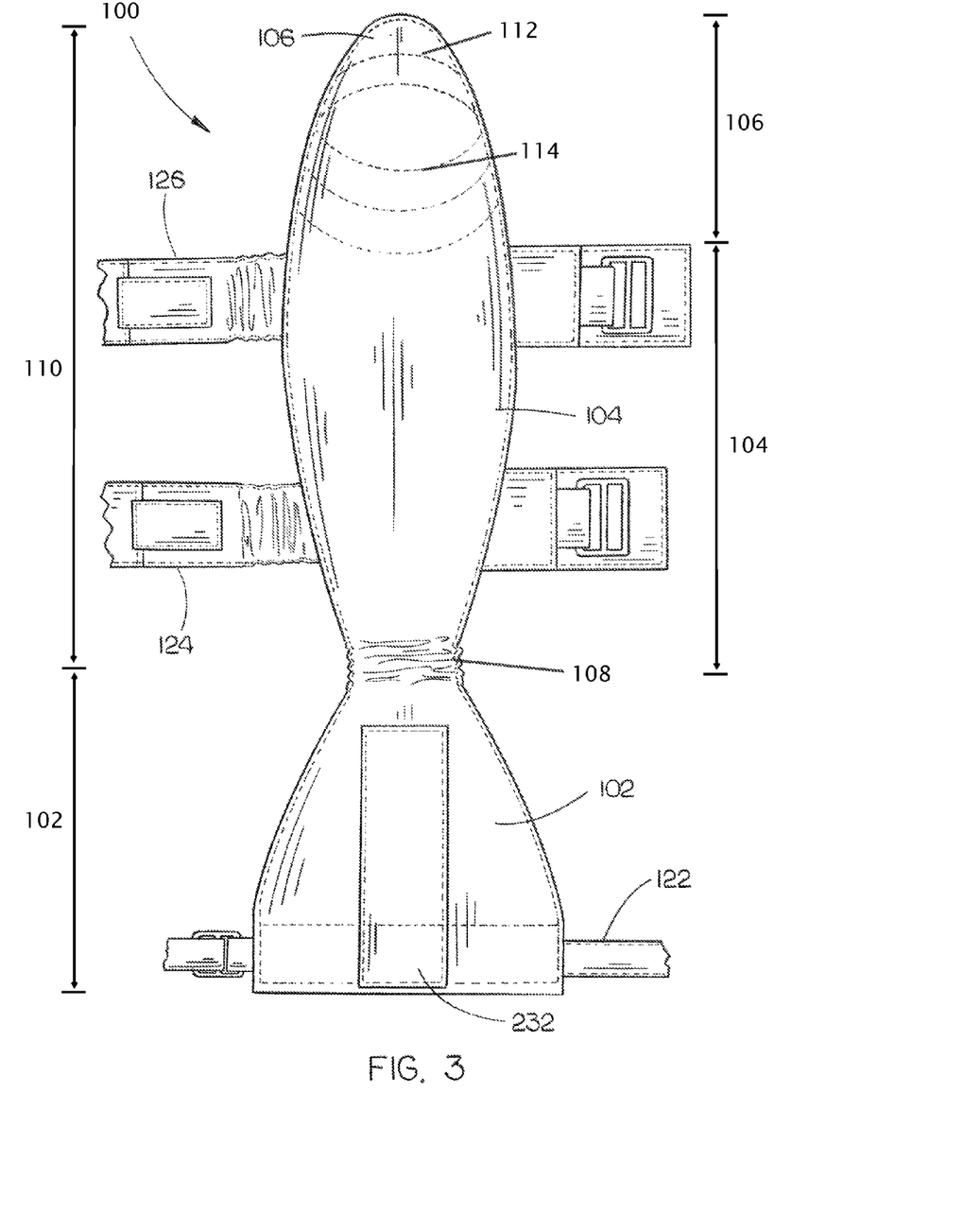
FIG. 3 is a diagram of a distal side of the wrap-around canine hunting vest in accordance with an embodiment of the present invention.

Referring to FIG. 3, a diagram of a distal side of the wrap-around canine hunting vest in accordance with an embodiment of the present invention is shown. The wrap around canine hunting vest is comprised of two sections, the chest shield 102 and the ventral shield 110. Ventral shield 110 is further comprised of sternal shield 104 and caudal abdominal shield 106. Brisket couple 108 is configured to join a caudal end of chest shield 102 with a cranial end of ventral shield 110. Brisket couple 108 functions to join the shields using elastically coupled fabric, hook and loop fasteners, snaps, buttons, and the like. Preferably, brisket couple 108 is configured of an inner elastic material surrounded by gathered external material to allow for elastic elongation for a secure fit as the canine moves. Brisket couple 108 may be permanently affixed to each of the chest shield 102 and the ventral shield 110 and may be integrated within a continuous structure of solid external material. Alternatively, brisket couple may be removably coupled to each of the ventral 110 and chest 102 shields.

Ventral shield 110 is comprised of sternal shield 104 joined with caudal abdominal shield 106. Sternal shield functions to protect the area of the canine from the brisket region to an upper abdominal region of the canine. Sternal shield has additional function of maintaining structure for each of the thoracic strap and the lumbar strap. Additional structure, greater than that found in the chest shield and lower abdominal shield, may be required within sternal shield to incorporate and support the thoracic and lumbar straps.

It is contemplated; chest shield and sternal shield may be constructed of material more resistive to obstacle impact than is the lower abdominal shield. For example, an owner may anticipate obstacles to impact the vest most likely in the chest shield and the sternal shield. Stronger outer and inner material may function to protect these anticipated obstacles.

Figure 7:
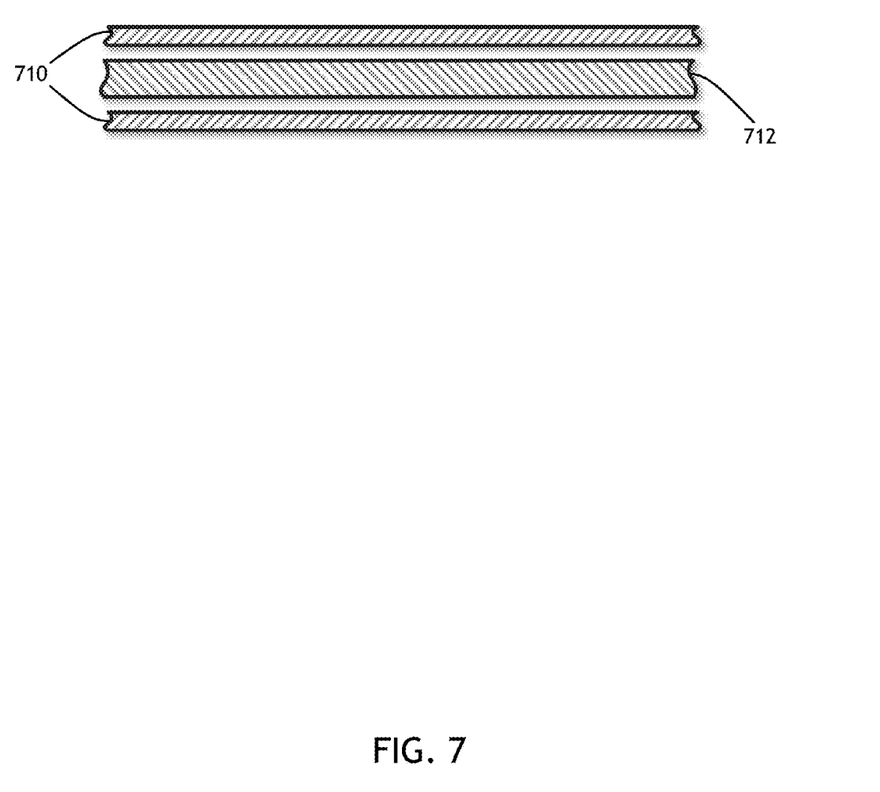
FIG. 7 is a diagram of the multilayer fabric surrounding a protective hardened layer.

Referring to FIG. 7, each Each of the chest, sternal, and caudal abdominal shield functions to protect the canine from obstacles encountered as the canine moves. Specifically, each shield may be constructed of fabric optimal for protection of the ventral of the canine. It is contemplated herein, nylon, multilayer fabric 710 surrounding a protective hardened layer 712, leather and the like may function to protect the ventral area of the canine from encountered obstacles. In embodiments, layers of material and layers of material with internal hardened layer or layers may function to protect the canine. Specifically, if an owner is concerned about a barb wire threat, the chest and sternal shields may be comprised of an outer layer of orange nylon, with an internal layer of hardened plastic. The width of the plastic internal layer may be optimal for resistance to puncture from barbs encountered on a barb wire fence. Optimally, a one mm thick layer of plastic may function to protect the ventral of the canine while offering little additional weight to the overall vest.

Additionally, the internal layers may be functional to protect the canine against more substantial threats. It is contemplated; wire mesh, chain mail, flexible protective mesh or a Kevlar inner layer may protect the canine from addition threats. Specifically, should a wild boar or additional toothed threat attack a canine, the more substantial inner layer may protect the canine from attack.

Additionally, the hunting vest may be constructed of material conducive to visibility. For example, brightly colored fabric may function for protection as well as visibility. Preferably, a white, hunter orange or multicolored material may function to aid in visibility. Specifically, a hunter may desire visibility of the canine in low light conditions such as early morning or evening. In addition to color, collar 122, thoracic strap 124 and lumbar strap 126 may be configured to receive a battery and light device to aid in visibility. Conversely, should a hunter desire concealment of a canine, the vest may be constructed of a camouflage material to aid in concealment.

Caudal abdominal shield 106 is preferably configured to function in one of two positions. The cranial end of caudal abdominal shield is constructed of malleable material to allow for the caudal abdominal shield to freely move between the two positions and to any intermediate position. In a first position, caudal abdominal shield is pulled distal from the skin of the canine enabling the canine to freely urinate. In a second position, the caudal abdominal shield 106 is pushed proximal to the skin of the canine to protect the lower abdomen and urogenital regions of the canine. In embodiments, the caudal abdominal shield 106 may be configured to remain in only the second position to allow continuous protection for a female canine where no urination obstruction is anticipated.

In operation, as the canine is upright and walking, the caudal abdominal shield 106 is gravitationally pulled to the first (lowered) position distal from the skin of the canine. It is contemplated the first position and the second position may be optimally 90 degrees apart. In this first position, a male canine may freely urinate without obstruction from the caudal abdominal shield. Further, the first position may permit greater heat escape form the skin of the canine as the exposed portion of skin remains uncovered.

As the caudal abdominal 106 shield is impacted by an obstacle, it may partially or fully retract to the second position. Retracting the caudal abdominal shield 106 provides for protection of the lower abdomen and urogenital regions of the canine. Contemplated obstacles may include water as the canine is swimming. The forward motion of the canine through the water acts upon the caudal abdominal shield and moves it to the second position. In the water, the hunting vest may function to protect the canine from an underwater obstacle not visible to the canine or the owner.

In heavy grass and timber, the caudal abdominal shield 106 may be impacted and moved to the second position by a plurality of obstacles. Fallen trees, specific species of weeds containing thorns or burrs, may also be of concern for ventral protection. Particularly for a canine with short legs and longer fur, the hunting vest may protect the fur from obstacle entanglement as the ventral may travel closer to the expected obstacle.

In particular, a horizontal fence may be one obstacle against which the hunting vest may protect. The canine may be focused on the job at hand and have no concern for obstacles between it and the object of its attention. Wires and barbs of a horizontal fence may cause damage to vital organs of the canine. The wrap around canine hunting vest is specifically intended to protect against these threats.

The caudal abdominal shield 106 may be sized by each individual owner to fit a specific canine. The caudal abdominal shield 106 is configured with a plurality of sizing stitches 112, 114. Sizing stitches may function to maintain the integrity of the hunting vest should the owner remove a portion of the caudal abdominal shield 106 caudal of the sizing stitches. For example, an owner of a male canine may prefer to permanently remove material of the caudal abdominal shield 106 caudal of one of the lines of sizing stitches. If the sizing stitches were not in place, the layers of the hunting vest may fray and become permanently damaged with continued use. With the sizing stitches in place, the material of the hunting vest cranial of the sizing stitches is able to maintain its integrity after the material caudal to it is permanently removed.

Parallel sizing stitches 112 may be arcs of concentric stitches parallel to a caudal end of caudal abdominal shield 106. Conversely, oppositely concentric sizing stitches 114 may function to maintain vest integrity as material caudal to the sizing stitches is removed.

Alternatively, it is contemplated herein a reattachably removable portion of the caudal abdominal shield 106 may function within the scope of the present invention. Hook and loop fasteners, snaps, buttons and the like may function to allow an owner to detach a portion of the caudal abdominal shield and then reattach the portion for later use. For example, an owner of a male canine may desire to detach a portion of the caudal abdominal shield 106 for unobstructed urination by the male. At a later date, the owner may desire to mount the wrap around canine hunting vest to a female canine. In this fashion, the owner may reattach the detached portion for protection of the lower abdomen and urogenital regions of the female.

Figure 4:
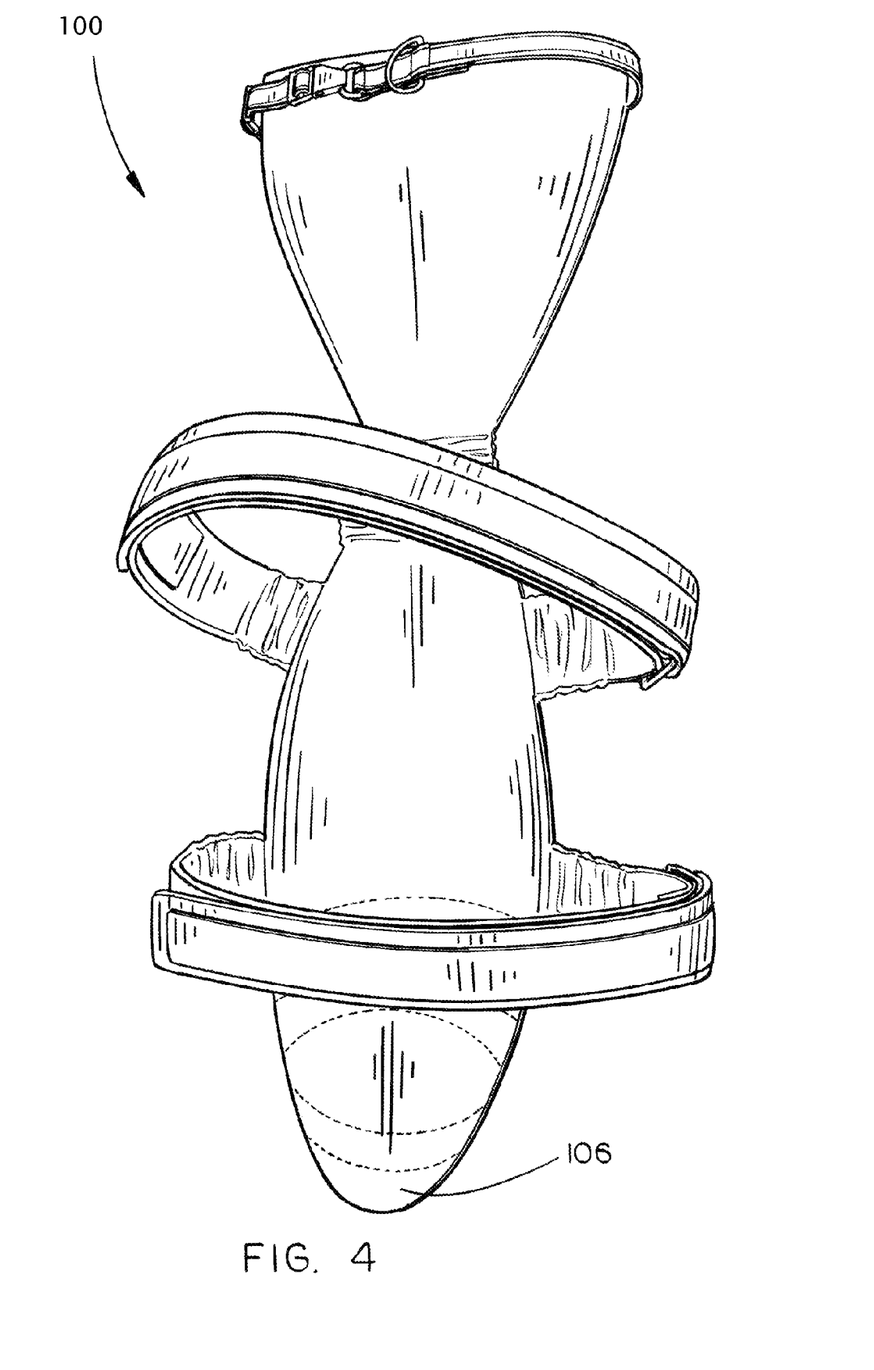
FIG. 4 is an diagram of a proximal side of the wrap-around canine hunting vest with coupled collar and straps in accordance with an embodiment of the present invention.

Referring to FIG. 4, a diagram of a proximal side of the wrap-around canine hunting vest with coupled collar and straps in accordance with an embodiment of the present invention is shown. Caudal abdominal shield 106 is indicated in second position able to protect the urogenital regions of the canine.

Figure 5:
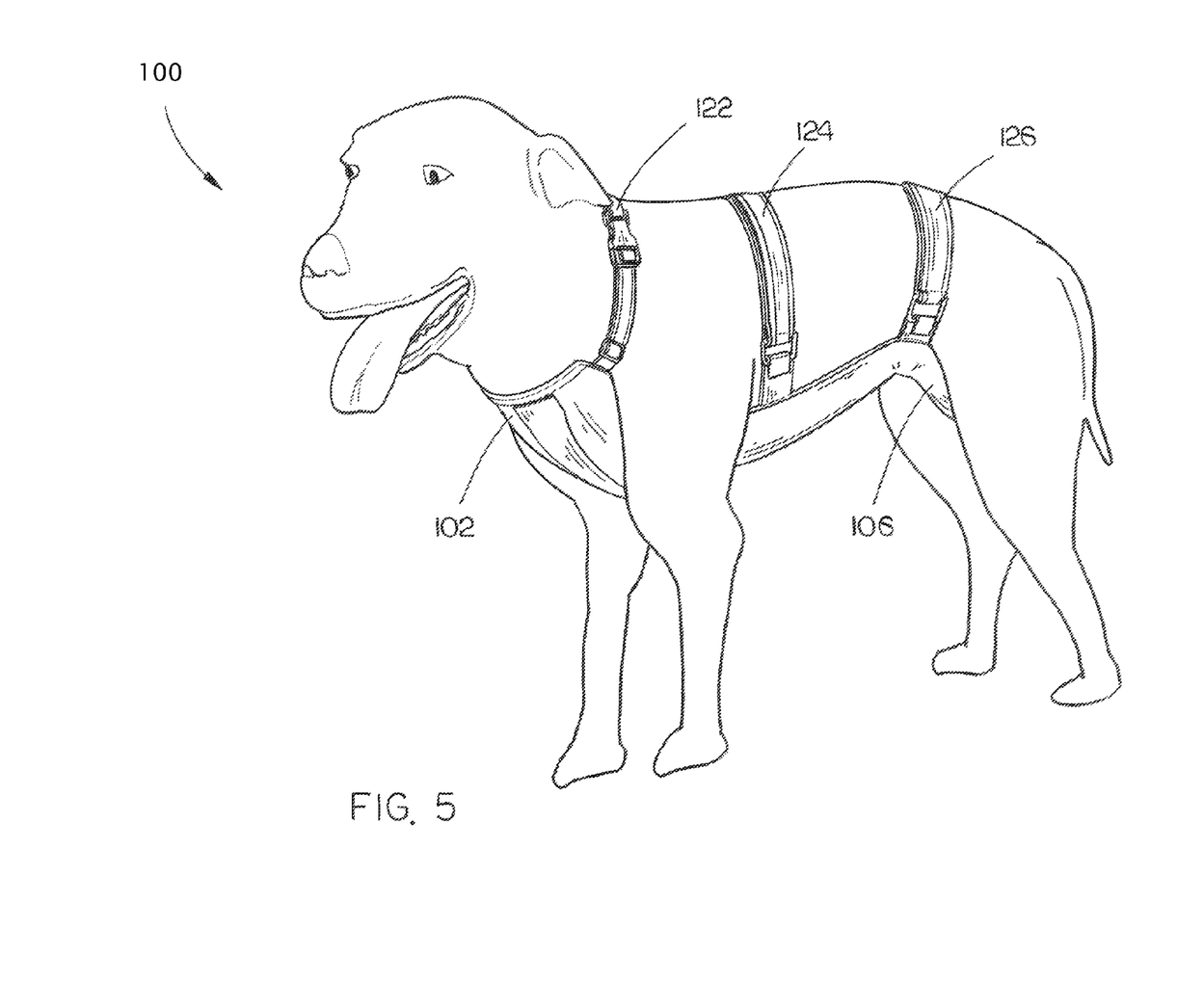
FIG. 5 is a diagram of a canine with a mounted wrap-around canine hunting vest in accordance with an embodiment of the present invention.

Referring to FIG. 5, a diagram of a canine with a mounted wrap-around canine hunting vest in accordance with an embodiment of the present invention is shown. Collar 122 may secure a cranial portion of the chest shield 102 in place on the canine. Thoracic strap 124 may function to secure the sternal shield 104 on the canine while lumbar strap 126 functions to secure the caudal end of sternal shield and the cranial end of caudal abdominal shield 106. Caudal abdominal shield 106 is indicated in first position distal from the skin of the canine.

Figure 6:
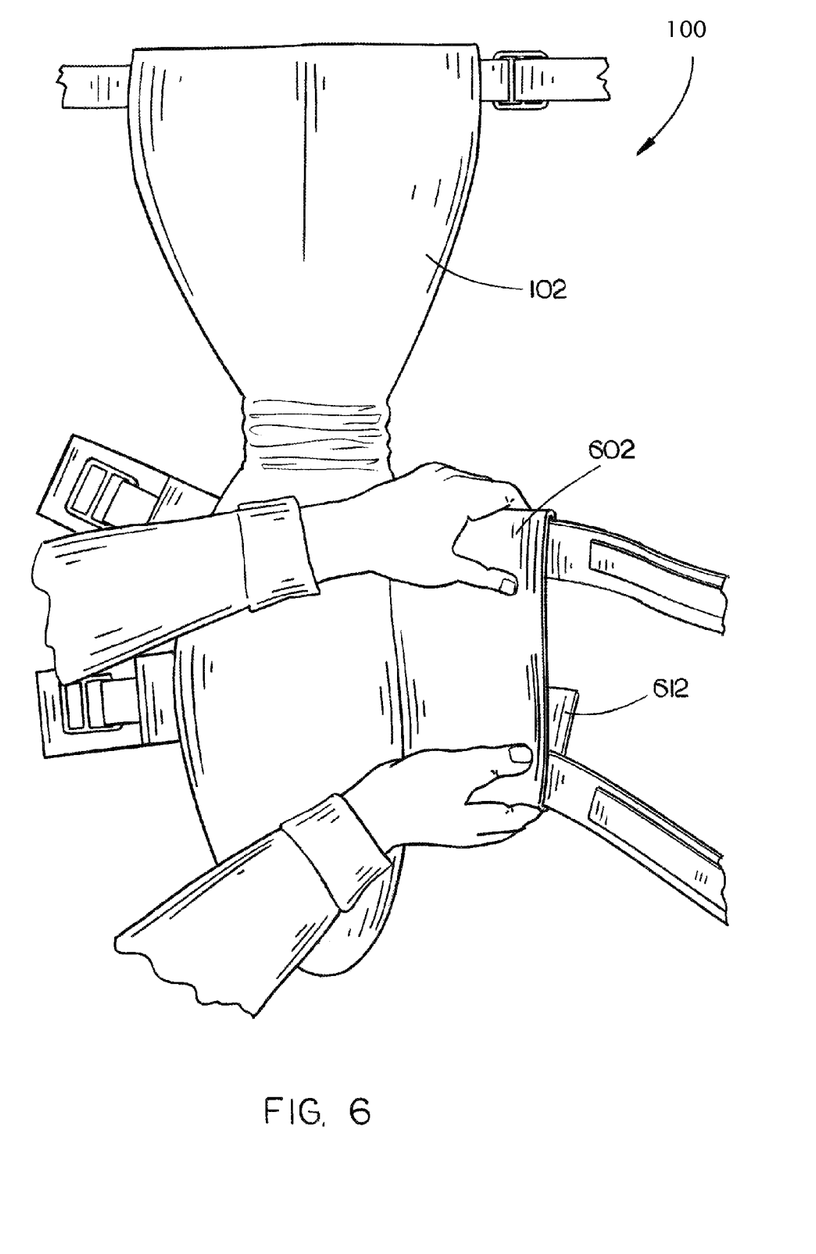
FIG. 6 is a diagram of a removable auxiliary cargo compartment coupled to a wrap-around canine hunting vest in accordance with an alternate embodiment of the present invention.

Referring to FIG. 6, a diagram of a removable auxiliary cargo compartment coupled to a wrap-around canine hunting vest in accordance with an alternate embodiment of the present invention is shown. Removable auxiliary cargo compartment 602 may function to secure additional items carried by the canine. Attachment straps 612 function to secure the removable auxiliary cargo compartment to each of the thoracic strap 124 and the lumbar strap 126. For example, removable auxiliary cargo compartment may be fitted with compartments configured for a water bladder, a food container, and a product of the harvest. Specifically, a compartment sized for a duck or a pheasant may be functional within the scope of the present invention.

It is further contemplated; a cargo compartment 602 may be of variable size to contain variable sized cargo. Further, a cargo compartment encircling a majority of the trunk of a canine falls within the scope of the present invention. The cargo compartment 602 may extend from one lateral edge to the opposite lateral edge of the sternal shield. In addition, a cargo compartment 602 may extend cranially to attach not only to the lumbar and thoracic straps, but also attaching to the collar as well.

In embodiments, cargo compartment 602 may be configured for insertion of protective material. For example, as in the layered approach to the ventral shield, the cargo compartments may receive an inner layer of protective material for protection of the canine. It is contemplated hardened plastic, wire mesh or additional material may function to protect the canine from expected threats.

In embodiments, flotation devices may be functional with the removable auxiliary cargo compartment. For example, the removable auxiliary cargo compartment 602 may be configured with a plurality of air bladders designed for flotation assistance for the canine. In this case, thoracic and lumbar straps may be configured with a device for providing additional security of the removable auxiliary cargo compartments in place when mounted on the straps.

Additionally, each cargo compartment 602 may detachably couple to an opposite cargo compartment, and adjacent cargo compartment, and the sternal shield for additional security. For example, in a flotation embodiment, an owner may couple two oppositely placed cargo compartments 602 to each other. In this configuration, each of the oppositely placed cargo compartments may be configured to detachably couple to the other via an additional strap and buckle routed between the sternal shield and the canine. Here, the additional strap and buckle keeps the flotation cargo compartments in place for a balanced buoyant force.

In embodiments, cargo compartment 602 may detachably couple to the sternal shield 104. For example, a zipper configuration, hook and loop fasteners, and the like may detachably couple cargo compartment to the sternal shield.

Conclusion

Specific blocks, sections, devices, functions, processes and modules may have been set forth. However, a skilled technologist will realize that there are many ways to partition the method and system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the method and system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

In the present disclosure, the methods disclosed may be implemented as sets of instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A canine ventral protection garment, comprising:
 a chest shield, the chest shield configured to cover an area from a tracheal region of a canine to a brisket region of the canine, the chest shield having an attached collar on a cranial end and an attached brisket couple on a caudal end, the collar configured to removably secure the canine ventral protection garment to the canine;
 a sternal shield having a cranial end coupled to the chest shield via said brisket couple, the sternal shield configured to caudo-cranially protect an area of the canine from the brisket region of the canine to an upper abdominal region of the canine, the sternal shield configured to laterally protect the canine equally and oppositely extending from a sternum region to a region encompassing at least a costal cartilage range of each rib of the canine;

a caudal abdominal shield configured to assume a first position gravitationally distal from the canine and a second position proximal to the canine, the caudal abdominal shield movable from the first position to the second position as a result of impact with an obstacle, a cranial end of the caudal abdominal shield constructed of a malleable material to allow the caudal abdominal shield to freely move between the first position, the second position and an intermediate position, the first position gravitationally distal from the canine allowing a male canine to freely urinate without obstruction from the caudal abdominal shield, the caudal abdominal shield configured to caudo-cranially protect the canine from the upper abdominal region to a urogenital region of the canine, the caudal abdominal shield and the sternal shield coupled to form a ventral shield;

wherein each of the chest shield, the sternal shield, and the caudal abdominal shield is constructed of a multilayer fabric surrounding a protective hardened layer;

a thoracic strap coupled to the ventral shield, the thoracic strap configured to encircle a trunk of the canine about a caudal-cranial axis of the canine, the thoracic strap configured to removably secure the canine ventral protection garment to the canine; and a lumbar strap coupled to the ventral shield, the lumbar strap configured to encircle the trunk of the canine about the caudal-cranial axis of the canine, the lumbar strap configured to removably secure the canine ventral protection garment to the canine;

wherein the caudal abdominal shield further comprises a plurality of sizing stitches, the plurality of sizing stitches configured for coupling at least two layers of the caudal abdominal shield as a section of the caudal abdominal shield caudal to the sizing stitches is removed; and wherein the plurality of sizing stitches are parallel to a caudal end of the caudal abdominal shield in a concentric arc configuration.

2. The canine ventral protection garment of claim 1, wherein the attached collar is detachable from the chest shield, the collar further configured, when coupled to the canine, to be of sufficient strength to lift the canine.

3. The canine ventral protection garment of claim 1, wherein the thoracic strap and the lumbar strap are further configured to accept a removable auxiliary cargo compartment, the removable auxiliary cargo compartment configured for accepting and securely carrying a cargo.

4. The canine ventral protection garment of claim 1, wherein the multilayer fabric are constructed of a multi-layer pliable fabric, the multi-layer pliable fabric optimally suited for obstacle resistance.

5. The canine ventral protection garment of claim 1, wherein the brisket couple is configured for elastic deformation under tension.

6. The canine ventral protection garment of claim of claim 1, wherein the thoracic strap and the lumbar strap are configured with hook and loop fasteners for removably securing the canine ventral protection garment to the canine.

7. The canine ventral protection garment of claim 1, wherein the plurality of sizing stitches are oppositely aligned with the caudal end of the caudal abdominal shield in a concentric arc configuration.

8. A canine ventral protection garment, comprising:
a chest means for protection of a canine from a tracheal region to a brisket region;
a ventral means for protection of the canine from the brisket region to a urogenital region;
means for elastically coupling the chest means to the ventral means;
means for detachably mounting the canine ventral protection garment to the canine, including:
a collar means for detachably mounting a cranial end of the canine ventral protection garment around a neck of the canine;
a thoracic means for detachably mounting a central portion of the canine ventral protection garment around a thoracic trunk of the canine;
a lumbar means for detachably mounting a caudal portion of the canine ventral protection garment around a lumbar trunk of the canine;
wherein the ventral means further comprises a means for allowing a displacement of a caudal abdominal portion of the ventral means to gravitationally extend distal from the canine enabling the canine to unobstructedly urinate;
the means for allowing a displacement of a caudal abdominal portion of the ventral means to gravitationally extend distal from the canine enabling the canine to unobstructedly urinate further configured for allowing a retraction of the caudal abdominal portion of the ventral means to protect the urogenital region of the canine as the caudal abdominal portion of the ventral means is impacted by an obstacle;
wherein the caudal abdominal shield further comprises a plurality of sizing stitches, the plurality of sizing stitches configured for coupling at least two layers of the caudal abdominal shield as a section of the caudal abdominal shield caudal to the sizing stitches is removed; and
wherein the plurality of sizing stitches are parallel to a caudal end of the caudal abdominal shield in a concentric arc configuration.

9. The canine ventral protection garment of claim 8, wherein the thoracic means and the lumbar means are configured to accept a removable auxiliary cargo means for accepting and securely carrying cargo.

* * * * *